United States Patent [19]
Niida et al.

[11] 3,832,394
[45] Aug. 27, 1974

[54] METHANEPHOSPHINYLETHANE SUBSTITUTED AMID TRIMER OF ALANINE

[75] Inventors: Taro Niida; Shigeharu Inoue, both of Yokohama; Takashi Tsuruoka, Kawasaki; Takashi Shomura, Yokohama; Yasumitsu Kondo, Yokohama; Yasuaki Ogawa, Yokohama; Hiroshi Watanabe, Yokohama; Yasuharu Sekizawa, Tokyo; Tetsuro Watanabe, Yokohama; Hiroshi Igarashi, Chigasaki, all of Japan

[73] Assignee: Meiji Seika Kaisha, Ltd., Tokyo, Japan

[22] Filed: July 17, 1972

[21] Appl. No.: 272,676

[52] U.S. Cl............ 260/502.5, 71/3, 71/86, 196/109, 195/113, 260/534 C, 424/211
[51] Int. Cl....... C07f 9/46, A61k 27/00, A01n 9/36
[58] Field of Search............................ 260/502.5

[56] References Cited
UNITED STATES PATENTS
2,381,071 8/1945 McNally et al................. 260/502.5
2,609,390 9/1952 Bersworth...................... 260/502.5
3,036,087 5/1962 Anstol........................... 260/502.5
3,455,675 7/1969 Irani.............................. 260/502.5

OTHER PUBLICATIONS

Isono, "Agr. Biol. Chem.," Vol. 29, (1965) pp. 848–854, S58J.A37.

Isono, "Agr. Biol. Chem.," Vol. 31 (1967) pp. 190–199, S583.A37.

Primary Examiner—Joseph E. Evans
Attorney, Agent, or Firm—Larson, Taylor and Hinds

[57] ABSTRACT

New antibiotic SF-1293 substance and a microbiological process for the production thereof. SF-1293 substance can be produced by cultivation of Streptomyces hygroscopicus SF-1293 (ATCC 21705) SF-1293 substance can be used to control various fungal infections of plants, for example, sheath blight and rice blast of rice plant, and to treat trichophytosis, as SF-1293 substance exhibits the growth of various fungi such as Pellicularia sasakii, Piricularia oryzae and Trichophyton asteroides.

1 Claim, 2 Drawing Figures

METHANEPHOSPHINYLETHANE SUBSTITUTED AMID TRIMER OF ALANINE

This invention relates to a new and useful antibiotic substance designated as SF-1,293 substance, and this invention further relates to the fermentative production of this antibiotic SF-1,293 substance as well as to its uses as pesticide and fungicide.

Most of pesticides which have been utilised in agriculture are such synthetic compounds which have been synthesized by chemical processes, and large quantities of synthetic chlorine-containing compounds, synthetic mercury-containing compounds and synthetic arsenic-containing compounds etc., have been applied as the pesticides to various plants and soil. As a rule, however, these synthetic pesticides are entirely or relatively difficult to be degraded or decomposed after they are applied to the plants or soil, and therefore they continue to exist on or in the body of the plants and also in the soil. The continued existence of these pesticides applied can lead to the problem of pollution of the natural environment and environmental destruction. Accordingly, a demand is increasing in recent years to exploit such pesticides which are capable of being degraded and dissipating soon when they have exerted their pesticidal actions as intended after the application of them. As the pesticides of antibiotics type are generally more degradable than the synthetic pesticides, it is more reasonable and desirable to use antibiotic substances as the pesticide in order to avoid the problem of pollution of the natural environment.

An object of the present invention is to provide a new antibiotic substance which is useful as a pesticide to control various kinds of phyto-pathogenic microorganisms and particularly phyto-pathogenic fungi. A further object of the present invention is to provide a process for the production of such a new antibiotic substance. Another objects of the present invention will be clear from the following description.

We have made our extensive researches to examine metabolic products of many strains of the genus Streptomyces for the purpose to seek for a new antibiotic substance which is active in inhibiting the growth of micro-organisms pathogenic to various plant diseases. We have now found that an antibiotic substance which is unknown but exhibits a high activity of inhibiting the growth of various pathogenic fungi, including pathogenic fungi of rice sheath blight and rice blast, is produced and accumulated in the culture of a strain of the genus Streptomyces, and that this active substance can be isolated from the culture. We have succeeded in isolating this active substance in a pure form, and we have designated this active substance as SF-1,293 substance.

According to a first aspect of the present invention, therefore, there is provided a new antibiotic SF-1,293 substance effective in inhibiting the growth of fungi, which forms a white colored amorphous powder melting at 159° – 161°C., is soluble in water and methanol but sparingly soluble in ethanol, butanol, acetone, ethyl acetate, chloroform, benzene, hexane and ethyl ether, which is amphoteric and positive in the reactions with ninhydrin reagent, biuret reagent and Lemieux reagent but is negative in the reactions with ferric chloride, Fehling reagent, Molisch reagent and Folin reagent, which shows an optical rotation of $[\alpha]_D^{25} = $ minus 34° in its 1 percent aqueous solution, which gives an elementary analysis C 40.28 percent, H 6.82 percent, N 11.89 percent, P 8.90 percent and O 32.11 percent (the balance), which shows a molecular weight of 355 as determined from the titration curve and hence has an empirical formula $C_{11}H_{22}O_6N_3P$, and which exhibits characteristic absorption bands in the infra-red region of spectrum when pelleted in potassium bromide at the following wave numbers in $cm^{-1}$: 1,650 and 1,540 attributable to the amide linkages.

This SF-1293 substance is now identified as a compound represented by the following formula:

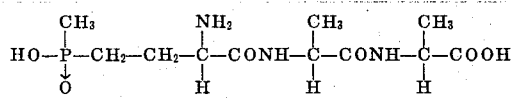

Further properties of the SF-1,293 substance are described below.

In filter paper electrophoresis, the SF-1293 substance migrates over a distance of 4 cm towards the cathode in 20 minutes at a pH of 1.9 and at a voltage of 3,500 volts, while it migrates over a distance of 5.5 cm towards the anode in 2 hours at a pH of 9.5 and at a voltage of 250 volts. This fact indicates that the SF-1,293 substance is an amphoteric substance.

In paper chromatography, the SF-1,293 substance shows the following RF-values for different solvent systems: 0.02 for water-saturated n-butanol; 0.98 for 3 percent aqueous ammonium chloride; 0.50 for 75 percent aqueous phenol; 0.92 for 50 percent aqueous acetone, 0.11 for n-butanol-methanol-water (4:1:2) 0.01 for benzene-methanol (3:1) and 0.93 for distilled water.

In silica gel and cellulose thin layer chromatography, the SF-1,293 substance exhibits different Rf-values for different solvent systems as shown in the following table. With different solvent systems, the SF-1293 substance gives a single spot having different Rf-values, and therefore it is confirmed that the SF-1,293 substance is pure and homogeneous.

Table 1

| | Rf-Values | |
|---|---|---|
| Developing solvent systems | Silica gel thin layer chromatography | Cellulose thin layer chromatography |
| n-Butanol-acetic acid-water (2:1:1) | 0.42 | 0.65 |
| n-Butanol-methanol-water (4:1:2) | 0.21 | 0.41 |
| Ethanol-ammonia-water (8:1:1) | 0.65 | 0.43 |
| Ethanol-water (4:1) | 0.25 | 0.66 |
| n-Propanol-pyridine-acetic acid-water (15:10:3:10) | 0.45 | 0.40 |

The SF-1293 substance was hydrolysed by treating with 6N hydrochloric acid at 110°C. for 20 hours. When the reaction mixture from this hydrolysis reaction was examined by paper chromatography, it was observed that there were given two spots which were positive in the reaction with ninhydrin reagent, and that one of these two spots showed a Rf-value corresponding to that of alanine.

The SF-1,293 substance shows only the terminal absorption in the ultra-violet region of spectrum.

Referring to the attached drawings.

Figure 1:
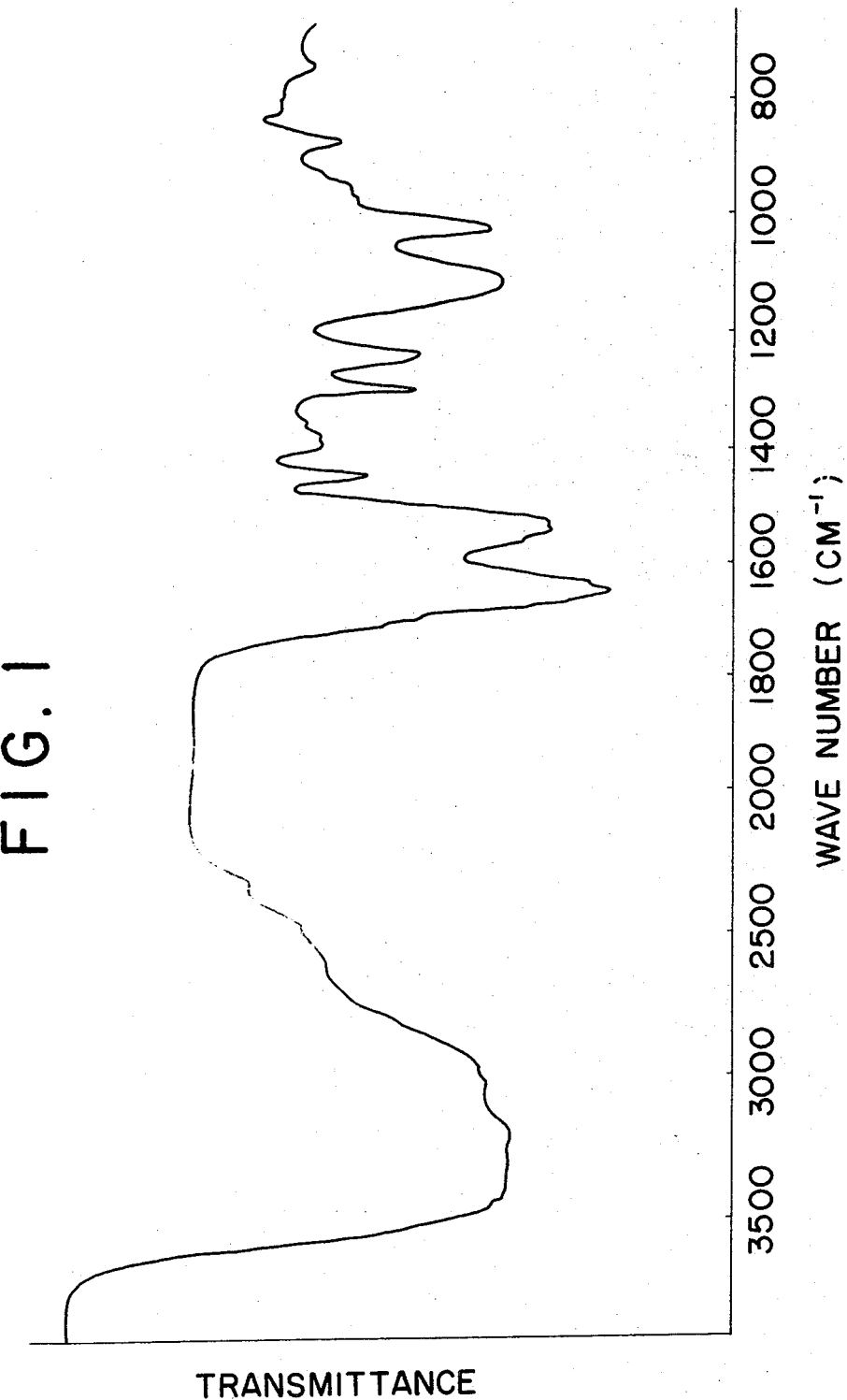
FIG. 1 shows a curve of the infra-red absorption spectrum of the SF-1,293 substance pelleted in potassium bromide.
Figure 2:
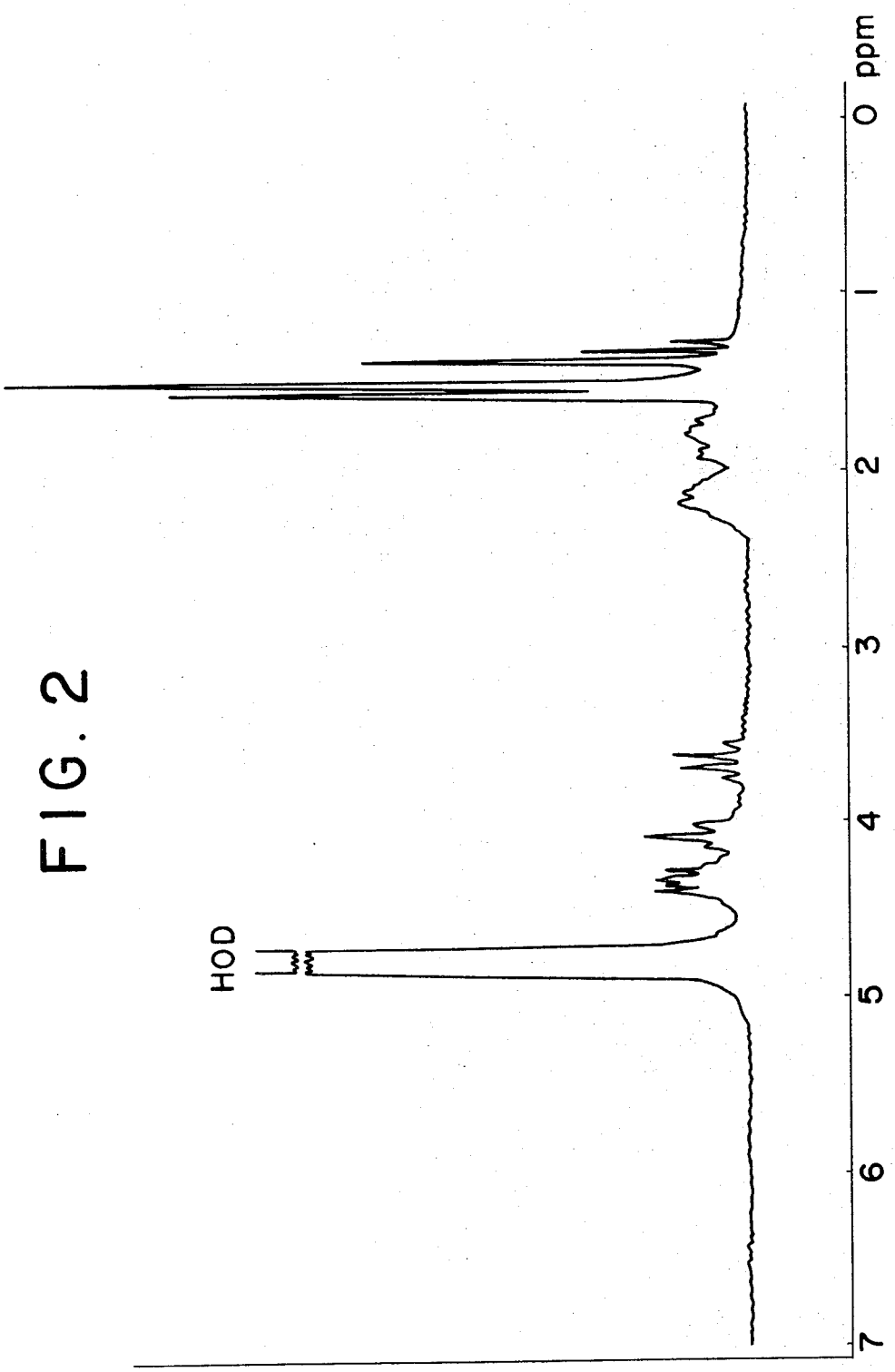
FIG. 2 shows a curve of the nuclear magnetic resonance spectrum of the SF-1,293 substance dissolved in deutero-water.

Referring to the infra-red absorption spectrum curve of the SF-1,293 substance, it is seen that the absorption band of the amide I exists at 1,650 $cm^{-1}$ and the absorption band of the amide II exists at 1,540 $cm^{-1}$. From this, it is clear that the SF-1293 substance is one of the peptide-type antibiotics.

The SF-1,293 substance mainly exhibits an activity of inhibiting the growth of fungal microorganisms. The minimum inhibitory concentrations of the SF-1,293 substance against various fungi were determined using the known broth dilution method and are shown in Table 2 below.

Table 2

| Test micro-organisms | Minimum inhibitory concentrations (mcg/ml) |
|---|---|
| Alternaria kikuchiana | 3.1 |
| Alternaria mali | 3.1 |
| Botrytis cinerae | 3.1 |
| Glomerella cingulata | 6.2 |
| Pellicularia sasakii | 0.09 |
| Mucor angulisporus | 100 |
| Leptosphaeria salvinii | 0.75 |
| Sclerotinia sclerotiorum | 0.37 |
| Trichophyton asteroides | 0.18 |
| Piricularia oryzae | 25 |

The culture medium used for the determination of the minimum inhibitory concentrations was Czapek's agar medium.

As will be seen from the results of Table 2, the SF-1,293 substance exhibits a high antimicrobial activity of inhibiting the growth of a wide range of phyto-pathogenic micro-organisms. Furthermore, the SF-1,293 substance was confirmed to be highly effective in controlling sheath blight (*Pellicularia sasakii*) of rice plants when a series of tests were carried out in a green house and paddy field.

Polyoxins (see the "Agricultural biological chemistry" Vol. 29, pages 848 – 854 (1965) and Vol. 31, pages 190 – 199 (1967)) and validamycins A and B (see the "Journal of Antibiotics" Vol. 24, pages 119 – 123 (1971)) are known as such antibiotics which are effective to inhibit the growth of various phyto-pathogenic microorganisms and particularly of *Pellicularia sasakii*. The SF-1,293 substance can be differentiated from polyoxins which show clear absorption band in the ultra-violet region of spectrum, and also from validamycins which are glycoside-type antibiotic.

As mentioned in the above, the SF-1,293 substance of the present invention has antimicrobial activity and particularly fungicidal activity against phyto-pathogenic fungi. The SF-1,293 substance is useful for the protection of plants from attack by phyto-pathogenic fungi as well as for the therapeutic treatment of infections of plants which have been caused by phyto-pathogenic fungi.

According to a second aspect of the present invention, therefore, there is provided a method of controlling fungal infections of plants, which comprises applying an effective amount of the SF-1,293 substance to plants. In particular, according to an embodiment of the second aspect of the present invention, there is provided a method of controlling the sheath blight and rice blast diseases of rice plant, which comprises applying an effective amount of the SF-1,293 substance to rice plants.

For use in the control of fungal infections of plants, the SF-1,293 substance of the present invention may be applied to plants, either directly or in admixture with an inert carrier or diluent which may be solid or liquid. The SF-1,293 substance of the present invention may be formulated in the form of dust, wettable powder, granules, solution, suspension or emulsion, as desired. For the preparation of dust, wettable powder and granules, solid carrier or vehicle such as diatomaceous earth, talc, kaolin, clay, silica, calcium carbonate and the like may be used. For the preparation of solution, suspension and emulsion, liquid carrier or vehicle such as water and organic solvents, for example, xylene, toluene, benzene, methanol, ethanol, acetone, cyclohexanone, dimethyl-formamide and the like may be used. In these formulations as prepared, there may be incorporated a variety of surface-active agents as spreading agent, dispersing agent, wetting agent and/or emulsifying agent.

The SF-1,293 substance of the present invention also exhibits a high inhibitory activity to *Trichophyton asteroides* which causes the trichophytosis. Therefore, the SF-1,293 substance of the present invention is useful for the therapeutic treatment of trichophytosis. For use in the therapeutic treatment of trichophytosis, the SF-1,293 substance may be formulated into a solution in an appropriate organic solvent such as cetanol or into an ointment, and these formulations may externally be applied to the locus of skin where the trichophytosis has ocurred. The SF-1,293 substance is of a low toxicity. Acute toxicity, of the SF-1,293 substance was tested by intravenously injecting an aqueous solution of the SF-1,293 substance into groups of mice, each group consisting of 5 mice. None of mice was dead in each group treated at dosages of 25 mg/kg. and 50 mg/kg. of the SF-1,293 substance but all of mice were dead in a group treated at a dosage of 100 mg/kg. of the SF-1,293 substance.

The SF-1,293 substance of the present invention may be produced by cultivating a strain of *Streptomyces hygroscopicus* under aerobic conditions. According to a further aspect of the present invention, therefore, there is provided a process for the production of the SF-1,293 substance, which comprises cultivating a SF-1,293 substance-producing strain of *Streptomyces hygroscopicus* under aerobic conditions in a culture medium containing assimilable nitrogen and carbon sources to produce and accumulate the SF-1,293 substance in the culture, and then recovering this antibiotic substance from the culture.

As an example of the SF-1,293 substance-producing strain of *Streptomyces hygroscopicus* is such a strain which we firstly isolated from a soil sample and we have designated as *Streptomyces hygroscopicus* SF-1,293. This SF-1,293 strain has been deposited in the American Type Culture Collection, Washington D.C. under ATCC number 21,705 (a culture of this strain was received by the ATCC on 16th July, 1971) as well as in a Japanese public depository "Fermentation Research Institute," Chiba, Japan, under a deposition number FERM-P No. 996.

*Streptomyces hygroscopicus* SF-1,293 has the following microbiological characteristics:

I. Morphological observation

Aerial mycelium are well produced and spores are abundantly formed on starch-agar, oat meal-agar, yeast-malt-agar and tyrosin-agar media. Aerial mycelium branches simply but does not branch in the form of whorl. Closed, compact spirals or open, short spirals are formed at the tip of the aerial mycelium. No formation of sclerotium is observed. Electron-microscopic observation shows that the surface structure of the spore is smooth. Spores are of elliptical shape to oval shape, and 10 or more spores normally link with each other. The size of the spore is measuring 0.6 – 0.8 microns by 0.8 – 1.1 microns.

II. Characteristics on different culture media are tabulated in Table 3 below.

TABLE 3

| Culture medium | Growth | Aerial mycelium | Soluble pigment |
|---|---|---|---|
| Sucrose nitrate agar | Colorless to light brown, with slight greenish tinge | Scant, white to whity grey in color | None |
| Glucose asparagine agar | Cream to faint green | White, later turning into light greenish brown | None |
| Glycerine asparagine agar | Cream to light yellow | Scant, white in color | None |
| Starch agar | good growth, cream with faint greenish tinge, gradually turning into light brown | Abundant, greyish brown, gradually becoming hygroscopicus | None |
| Tyrosine agar | Good growth, yellowish cream to light yellowish brown | Abundant, greyish brown, gradually becoming hygroscopicus | None |
| Nutrient agar | Thin growth, light yellow | Scant, white in color | None |
| Yeast malt agar | Good growth, yellowish brown | Abundant, brownish grey, gradually becoming hygroscopicus | None |
| Oat meal agar | Good growth, light greyish green | Abundant, greyish brown, gradually becoming hygroscopicus | None |
| Yeast starch agar | Good Growth, yellowish brown | Abundant, brownish grey, gradually becoming hygroscopicus | None |
| Potato plug | Raised growth, highly wrinkled, light brown | Not observed | None |

Note: The incubation temperature was 28°C. on all the culture media.

III. Physiological properties:
1. Growth temperature range: Good growth is made at a temperature in a range of 20° to 40°C on yeast malt agar slant medium.
2. Liquefaction of gelatine: No liquefaction is observed during the incubation at 20°C for 30 days.
3. Hydrolysis of starch: Postive (strong)
4. Coagulation of skimmed milk: Negative (at 28°C and at 37°C)
5. Peptonization of skimmed milk: Positive (at 28°C and at 37°C)
6. Formation of melanin-like pigment: Negative IV. Utilization of carbon sources: (estimated in Pridham-Gottlieb's agar medium)
1. Utilize: D-glucose, D-fructose, D-mannitol, sucrose and raffinose.
2. Doubtful: D-xylose and L-arabinose.
3. Not utilize: I-inositol and rhamnose.

The above-mentioned microbiological characteristics of *Streptomyces hygroscopicus* SF-1,293 (hereinafter, merely called the SF-1,293 strain) may be summarised as follows: the aerial mycelium produces spirals and the surface structure of the spore is smooth. The color of the growth is cream to light green to yellowish brown. The aerial mycellium is greyish brown in color and gradually becomes hygroscopicus. Formation of soluble pigment is observed neither on synthetic culture media nor on organic culture media, and hence the SF-1,293 strain is non-chromogenic.

The above-mentioned properties of the SF-1,293 strain well coincide with those of the known species *Streptomyces hygroscopicus*. Thus, the SF-1,293 strain exhibits the following three properties:

a. The aerial mycelium produces spirals,
b. the aerial mycelium produced is greyish brown in color, and
c. the aerial mycelium becomes hygroscopicus:

Whose properties are characteristic of the known species *Streptomyces hygroscopicus*.

Comparison of the SF-1,293 strain is made with the known strain *Streptomyces hygroscopicus* according to the Waksman's description (Waksman's "The Actinomycetes" Vol. 2, pages 230 – 231 (1961)). It is recognized that the SF-1,293 strain is differentiated from the known species *Streptomyces hygroscopicus* with respect to the colors of the growth on the sucrose-nitrate agar and glucose-asparagine agar media as well as with respect to the formation of soluble pigment, but that the SF-1,293 strain well coincides with the known species *Streptomyces hygroscopicus* with respect to their other conditions of the growth and physiological properties.

In consequence, the SF-1,293 strain well coincides with the known strain of *Streptomyces hygroscopicus* mentioned in the Waksman's description in respect to the above-mentioned basic three characteristics, though they may be differentiated from each other with respect to some minute properties of them. Therefore, it is reasonable to consider that the SF-1,293 strain belongs to the species *Streptomyces hygroscopicus*. Accordingly, we have designated the SF-1,293 strain as *Streptomyces hygroscopicus* SF-1,293 in order to make the SF-1,293 strain distinguishable from the known strain of *Streptomyces hygroscopicus*.

The SF-1,293 strain has properties which are liable to vary as may usually be observed with the other Streptomyces. Thus, for example, the SF-1,293 strain may produce a variant or mutant when it is treated with various mutagens such as ultra-violet radiations, X-rays, radio-active rays, high-frequency electromagnetic waves and chemicals. Any natural or artificial variant or mutant of the SF-1,293 strain may be used for the production of the SF-1,293 substance according to the present invention, as long as the variant or mutant has the ability to produce the SF-1,293 substance of the present invention.

According to an embodiment of the present invention, therefore, there is provided a process for the production of the SF-1,293 substance, which comprises cultivating a strain of *Streptomyces hygroscopicus* identified as ATCC 21,705 under aerobic conditions in a culture medium containing assimilable nitrogen and carbon sources to produce and accumulate the SF-1,293 substance in the culture, and then recovering this antibiotic substance from the culture.

In the process according to the present invention, a SF-1,293 substance-producing strain of *Streptomyces hygroscopicus* and particularly the SF-1,293 strain (ATCC 21,705) may be cultivated in a known manner under aerobic conditions in a culture medium containing such nutrients which may be utilised by usual micro-organisms. As the nutrient sources may be employed any of the known nutrient substances which have commonly been used in the cultivation of the known strains of Streptomyces. For instance, glucose, starch, glycerine, sucrose, starch syrup, molasses and the like are useful as the carbon source. Further, soybean meal, wheat-embryo, meat extract, peptone, dried yeast, corn steep liquor, soluble vegetable protein, ammonium sulfate, sodium nitrate and the like may be used as the nitrogen source. If required, inorganic salts such as calcium carbonate, sodium chloride, potassium chloride, iron sulfate, nickel chloride, phosphates and the like may be added to the culture medium. In addition, to the culture medium may be added such organic and inorganic materials which aid the growth of the SF-1,293 strain and promote the production of the SF-1,293 substance.

As the method of cultivating the SF-1,293 strain, liquid cultivation methods and particularly liquid cultivation method under submerged aerobic conditions are most preferred similar to the general processes of the production of the known antibiotics. The cultivation may suitably be effected under aerobic conditions and the suitable incubation temperature is in a range of 25°C to 35°C. For the commercial or laboratory production of the SF-1,293 substance, however, it is often preferred to carry out the cultivation at a temperature in the vicinity of 28°C. In these circumstances, the concentration of the SF-1,293 substance in the culture broth reaches a maximum at the end of 3 to 5 days of fermentation, either in shake-cultivation method or in tank-cultivation method.

For assay of the SF-1,293 substance, the following method may be used: the assaying culture medium comprising 2.5 percent glucose, 0.2 percent sodium nitrate, 0.1 percent mono-potassium phosphate, 0.05 percent magnesium sulfate, 0.05 percent potassium chloride, 0.01 percent ferrous sulfate, 1.5 percent agar, pH 6.0 may be used. As the assaying micro-organism may be used *Pellicularia sasakii*. In this assaying method, at a concentration of 1 mcg/ml. to 32 mcg/ml. of the SF-1,293 substance, the relation between the logarithm of the concentrations and the diameter of the inhibition zone can be plotted linearly, giving the inhibition zone of 24 to 50 mm in diameter (as determined by the cupplate method).

For the control of fungal disease of plants, the culture broth containing the SF-1,293 substance which has been obtained from the cultivation of the SF-1,293 strain may directly be applied to plants without isolation of the SF-1,293 substance. However, the SF-1293 substance may be receovered from the culture by isolation and then purified by using any of the known methods which have commonly utilised for the recovery and purification of known antibiotics.

The SF-1,293 substance as produced by the cultivation of the SF-1,293 strain is mainly present dissolved in the liquid phase of the culture broth. As the SF-1,293 substance is a water-soluble and amphoteric substance as mentioned hereinbefore, it may be recovered from the culture by adsorbing either onto a cation-exchange resin such as sulfonated polystyrene resin (for example, a product commercially available under a trade name "Amberlite IR 120") and sulfonated copolymer of styrene and divinylbenzene (for example, a product commercially available under a trade name "Dowex 50W"), or onto an anion-exchange resin such as quarternary ammonium hydroxide derivative of polystyrene containing groups —N-(CH$_3$)$_3$OH as the functional group (for example, a product commercially available under a trade name "Amberlite IRA-400"), polyaminated polystyrene (for example, a product commercially available under a trade name "Amberlite IR-45") and polyaminated phenol-formaldehyde copolymer (for example, a product commercially available under a trade name "Amberlite IR-4B"), and then eluting from the resin with an aqueous solution of a suitable acid, alkali or salt.

For the recovery of the SF-1,293 substance from the culture broth of the SF-1,293 strain, it is effective to filter the culture broth, separate the filter cake (that is, the solid phase of the broth containing mycellium cake) from the filtrate (that is, the liquid phase of the culture broth), pass the filtrate through a column of a strongly acidic cation-exchange resin such as sulfonated copolymer of styrene and divinylbenzene (for example, a product commercially available under a trade name "Dowex 50W" of H cycle) and then pass a stream of aqueous ammonia through the resin column for elution. The eluate may be evaporated in vacuo to give a crude powder of the SF-1,293 substance.

For the purification of a crude powder of the SF-1,293 substance so obtained, it may be chromatographed on cellulose, silica gel, alumina or dextran gel which has been cross-linked with epichlorohydrin. In this way, the SF-1,293 substance may be obtained in the form of a pure white colored amorphous powder of a melting point of 159° – 161°C.

The present invention is now illustrated but in no way limited by the following Examples.

Example 1

A stock culture of *Streptomyces hygroscopicus* SF-1,293 (identifiled as ATCC No. 21,705) was inoculated to 15 litres of a liquid culture medium comprising 2.0 percent starch, 1.0 percent peptone, 0.3 percent meat extract, 0.05 percent di-potassium phosphate, pH 7.0, and then stirr-cultured at 28°C for 24 hours under aeration of prepare a seed culture.

This seed culture was inoculated to 200 l. of a liquid culture medium comprising 3.0 percent glucose, 1.0 percent starch syrup, 2.5 percent wheat-embryo, 0.5 percent soluble vegetable protein, 0.1 percent soybean oil, 0.1 percent yeast extract, 0.001 percent ferrous sulfate, 0.0001 percent nickel chloride, 0.0001 percent cobalt chloride, pH 7.0, and then stirr-cultured at 28°C for 96 hours under aeration. The resulting culture broth was adjusted to pH 3 by addition of 6N hydrochloric acid and then filtered to give 150 l. of the broth filtrate (potency, 110 mcg/ml.).

The broth filtrate was passed through a column of active carbon (of a volume of 7.5 l.), and subsequently 30 l. of water was passed through said column for the washing purpose. The solution which passed out of the column and the washings were combined together (to a total volume of 180 l.), and the combined solution was passed through a column of 9 l. of a cation-exchange resin comprising a polysulfonated copolymer of styrenedivinylbenzene of the H-cycle (commercially available under a trade name "Dowex 50W-X2") in the form of beads of 50 – 100 meshes in order to make the active substance adsorbed by the cation-exchange resin. The resin column was washed with water and then subjected to elution using 0.05N aqueous ammonia. The active fractions of the eluate were combined together (to a total volume of 45 l.), and the solution was concentrated by evaporation under reduced pressure to give 50 g. of a crude power of light yellowish brown color (potency, 200 mcg/mg).

20 g. of the crude powder so obtained was dissolved in 2 l. of distilled water, and the resulting solution was passed through a column of 1.7 l. of cation-exchange resin comprising a sulfonated copolymer of styrenedivinylbenzene of the H-cycle (commercially available under a trade name "Dowex 50W-X2") in the form of beads of 200 – 400 meshes, so that the active substance was adsorbed by the cation-exchange resin. The resin column was washed with water and then eluted with 0.01N aqueous ammonia while the eluate was collected in fractions of each 2.5 l. The fractions No. 37 to No. 42 which showed the antifungal activity were combined together and then concentrated by evaportion under reduced pressure to give 3.1 g. of a white colored powder containing the SF-1,293 substance (potency, 680 mcg/mg). 500 mg. of this powder was dissolved in 4 ml. of distilled water, and the resulting solution was passed through a column of 800 ml. of a dextran gel cross-linked with epichlorohydrin (a product commercially available under a trade name "Sephadex G-10") for the chromatographic purpose. The adsorbed active substance was chromatographically developed by passing distilled water through the column of the dextran gel, and the eluate was collected in fractions of each 6 ml. volume. Such fractions No. 55 to No. 58 which showed a single spot of the SF-1,293 substance on cellulose thin layer chromatography (using a solvent mixture of n-butanol-acetic acid-water (2:1:1) as the developing solvent) were combined together and then concentrated by evaporation under reduced pressure to yield 210 mg. of a pure, white-colored powder of the SF-1,293 substance (potency, 1,000 mcg/mg).

Example 2

5 g. of the crude powder of light yellowish brown color obtained in Example 1 was dissolved in 1 litre of distilled water, and the resulting solution was passed through a column of 300 ml. of an anion-exchange resin comprising a quarternary ammonium hydroxide derivative of polystyrene containing the functional groups —N-(CH$_3$)$_3$OH (commercially available under a trade name "Amberlite IRA-400"), so that the active substance was adsorbed by the anion-exchange resin. The resin column was washed with water and then eluted with 0.2N sulfuric acid. Active fractions of the eluate were combined together (to a total volume of 800 ml), and to the eluted solution was added an amount of barium carbonate. Barium sulfate which was formed was filtered off and the filtrate separated was immediately evaporated to dryness under reduced pressure to give 2.1 g. of a powder of a light yellow color.

This powder was dissolved in 300 ml. of distilled water and the solution was passed through a column of 100 ml. of an anion-exchange dextran gel containing diethylaminoethyl as the functional group (commercially available under a trade name "DEAE-Sephadex A-25") in the form of chloride. The column was washed with water and developed chromatographically using a 0.02 M aqueous solution of sodium chloride. Active fractions of the eluate were combined to a total volume of 450 ml. and then concentrated to dryness. The residue was extracted with methanol, and the methanolic solution was separated by filtration from the sodium chloride which remained un-dissolved. The methanolic extract was evaporated under reduced pressure to give 520 mg. of a white colored powder (potency 650 mcg/mg).

This powder was dissolved in a small amount of water, and the aqueous solution obtained was mixed with a small amount of cellulose powder. The mixture was dried up and placed on the top of a cellulose column (400 g.) and the column was developed using a solvent mixture of n-butanol-acetic acid-water (2:1:1). The eluate was collected in fractions of each 15 ml. volume. Such active fractions No. 71 to No. 80 were combined together and evaporated to dryness under reduced pressure. The residue obtained was dissolved in 10 ml. of distilled water and the aqueous solution was freezedried to yield 240 mg. of the SF-1,293 substance in the form of a pure, white colored powder (potency, 1,000 mcg/ml.).

Example 3

A stock culture of *Streptomyces hygroscopicus* SF-1,293 (identified as ATCC No. 21,705) was inoculated to 800 ml. of a liquid culture medium comprising 2.0 percent glucose, 2.0 percent dried bouillon, pH 7, and then stirr-cultured at 28°C. for 30 hours under aeration to give a seed culture.

This seed culture was inoculated to 35 l. of a liquid culture medium comprising 2.5 percent molasses, 1.0 percent glucose, 2.5 percent defatted cotton seed meal, 0.1 percent yeast extract, 0.5 percent wheat-embryo, pH 7, and then incubated at 28°C. for 72 hours under aeration and agitation. The culture broth obtained was adjusted to pH 3 by addition of 6N hydrochloric acid and then filtered to give 30 l. of the broth filtrate (potency, 180 mcg/ml.).

This broth filtrate was then treated in the same manner as in Example 1 for the recovery and purification of the SF-1,293 substance. 820 mg. of the SF-1,293 substance was yielded in the form of a pure, white colored powder (potency, 1,000 mcg/ml.).

Example 4

This example demonstrates that the SF-1,293 substance is highly effective to control the sheath blight disease of rice plants.

An inoculum of sheath blight-causing microorganism (*Pellicularia sasakii*) was inoculated by spraying onto aquatic rice plants in a paddy field. At an initial phase of infection when all the rice plants appeared to be infected evenly, a test solution containing an active substance at a concentration as indicated in Table 4 below was sprayed onto the infected rice plants. 5 Days after this first application of the test solution, a second application of the test solution was made, if required. The test was carried out in two replications. The test solution was applied at a rate of 150 l. per 10 ares. 14 Days after the first application of the test solution, length of such a lesion which developed to the highest extent among many lesions ocurring in each rice plant was measured for 40 rice plants per one plot, either treated or untreated. Rate of controlling effect was calculated according to the following equation:

Rate of controlling effect (percent) =

$$\left(1 - \frac{\text{Average length of the most developed lesion in the plot of rice plants treated}}{\text{Average length of the most developed lesion in the plot of rice plants untreated}}\right) \times 100$$

The test results obtained are shown in Table 4 below.

Table 4

| Active substance tested (concentration) | Times of application | Average length of the most developed lesion | Rate of controlling effect |
|---|---|---|---|
| The SF-1293 substance (40 ppm.) | 1 | 12.1 mm | 70.6% |
| The SF-1293 substance (20 ppm.) | 2 | 10.7 mm | 74.0% |
| Polyoxins (40 ppm.) (comparative) | 2 | 20.7 mm | 49.4% |
| Untreated | — | 41.1 mm | 0 |

From the results of the above Table, it is clear that the SF-1,293 substance exhibits a remarkably higher effect to control the sheath blight of rice plants in paddy field than the polyoxins which are known and have been utilized as one of antibiotics effective against the sheath blight.

In another tests, an aqueous solution of 30 ppm. of the SF-1,293 substance was sprayed onto rice plants which were planted in pots. After the sprayed solution was dried, an inoculum of *Pellicuraria sasakii* was sprayed onto the treated rice plants. The inoculated rice plants were then incubated at 30°C. for 5 days in a green house under a high humidity. Thereafter, the incubated rice plants were visually examined, and it was observed that the treated rice plants were prevented perfectly from the infection of sheath blight.

Example 5

A test solution containing an active substance at a concentration as indicated in Table 5 below was sprayed by means of a spray-gun evenly onto aquatic rice plants of 4 true leave age which were planted in pots of 9 cm in diameter. The test solution was sprayed at a rate of 35 ml. per two pots. After the sprayed solution was dried in air, the treated rice plants were placed in a green house at 25°C. and under a high humidity. In this green house, an aqueous suspension of spores of the rice blast-causing micro-organism (*Piricularia oryzae*) was sprayed onto the treated rice plants for inoculation. 5 days after the inoculation, the number of lesions per leaf of the infected rice plants was counted. Rate of controlling effect was calculated according to the following equation:

Rate of controlling effect (percent) =

$$\left(1 - \frac{\text{Average number of lesions per leaf in the plot of rice plants treated}}{\text{Average number of lesions per leaf in the plot of rice plants untreated}}\right) \times 100$$

The test results obtained are shown in Table 5 below.

TABLE 5

| Active substance tested | Concentration (ppm.) of the active substance in the test solution sprayed | Average number of lesions per leaf | Rate of controlling effect(%) |
|---|---|---|---|
| The SF-1293 substance | 25 | 0.5 | 96 |
| do. | 50 | 0.1 | 99 |
| do. | 100 | 0 | 100 |
| Kasugamycin (comparative) | 25 | 1.9 | 84 |
| do. | 50 | 1.1 | 91 |
| do. | 100 | 0.5 | 96 |
| Phenylmercuric acetate (comparative) | 15 (as Hg) | 1.1 | 91 |
| Untreated | — | 11.8 | 0 |

From the results of the above table, it is seen that the SF-1,293 substance is much more effective to control the rice blast than kasugamycin and phenyl-mercuric acetate which have frequently been utilized for that purpose.

Example 6

The SF-1,293 substance was formulated into a hydrophilic ointment containing 3 percent of the SF-1,293 substance well mixed with a mixture of cetanol-polyethylene glycol (commercially available under trade namr of "Emulgen 408") -white vaseline-water (18:5:38:39) as the ointment base.

Groups of male, white guinea pigs (10 guinea pigs in each group) of an average body weight of 240 g. were used as the test animal.

Hairs were removed from four separate sections, each of a size of about 4 × 4 cm., on the back portion of guinea pig, and the skin in these sections was lightly rubbed with a pumice stone. A suspension of *Trichophyton asteroides* which is one of the trichophytosis —causing micro-organisms was then applied onto the skin in these sections for inoculation. 2 Days after the inoculation, the above-mentioned ointment was applied to the skin situating in the aforesaid sections at a rate of about 0.2 g. per section. The application of the ointment was made for 10 days once a day. One of the four sections was used as the control (untreated) and was left free from the application of the ointment after the inoculation. 12 Days after the inoculation, the guinea pigs were killed, and three pieces of the skin (each piece was of a size of 3 mm × 3 mm) were cut out of the skin in each section. Each of these skin pieces was incubated at 27°C. for 7 days on Sabourand's agar medium to examine the presence of the inoculated microorganism. Rate of inhibition to the infection of Trichophyton asteroids was expressed by the following equation:

Rate of inhibition (percent) =

$$\left(1 - \frac{\text{Number of the incubated skin pieces showing presence of the fungus}}{\text{Total number of the incubated skin pieces}}\right) \times 100$$

It was found that the rate of inhibition of the SF-1,293 substance-treated sections was 73.3 percent and 0 percent for the control section (untreated). This indicates that the SF-1,293 substance is effective for the therapeutic treatment of the infection of Trichophyton asteroides.

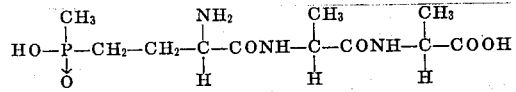

What we claim is:

1.